3,677,771
PROCESS FOR THE MANUFACTURE OF
CARAMELS
Charles Wesley Kolar, Jr., St. Louis, Mo., assignor to Ralston Purina Company, St. Louis, Mo.
No Drawing. Filed Sept. 21, 1970, Ser. No. 74,176
Int. Cl. A23g 3/00
U.S. Cl. 99—134 R     30 Claims

ABSTRACT OF THE DISCLOSURE

Production of a caramel-type confectionary product from a reconstitutable dried condensed milk product made by mixing concentrated fluid dairy whey with a proteinaceous source such as casein adding a partially hydrogenated fat to said mixture; drying the condensed milk product, and incorporating therewith a sequestering agent to sequester any calcium ions present in the milk product upon reconstitution and to prevent undesired calcium induced coagulation of the protein during subsequent heating to produce the caramel confection.

BACKGROUND OF THE INVENTION

This invention relates to an improved process for the production of a caramel-type confectionary product. Caramels are a highly desirable and useful confectionary product which are produced by the caramelization of sugar generally in the presence of protein, milk, solids, fat, and minor amounts of other materials to produce a soft, pliable confectionary product of a pleasingly chewable quality. Caramels not only make pleasing and desirable confectionary products in and of themselves but also are highly desirable as an ingredient of other confectionary products as for example, a candy bar which incorporates chocolate, fudge, nougat, etc. or other types of confectionary materials.

While caramel is most generally manufactured by the caramelization of sugar in the presence of liquid condensed milk, commercial processes for the production of caramels utilizing liquid condensed milk formulas suffer from certain economic disadvantages in that the milk or condensed milk employed must be refrigerated or otherwise maintained prior to use in order to prevent deterioration theeof. This not only adds to the cost of poducing the caramels but likewise reduces the quality thereof. Although skim milk products in liquid form have also been used in the production of caramels, it is necessary that a butter or vegetable fat be added to the caramel mixture in order to impart body to the product following caramelization, and skim milk products still require special storage thereof.

The use of dried reconstitutable milk products, especially those of a high fat content, have not been entirely successful in the production of caramels for several specific reasons. This is true even though the use of a dried milk product would overcome the aforementioned disadvantages of liquid milk products in that they may be readily reconstituted in water immediately prior to use with no refrigeration or storage of the milk required. The use of a dried reconstitutable milk product in the manufacturing of caramels is also advantageous economically since lower cost ingredients as for example, whey solids or vegetable proteinaceous materials may be incorporated as an ingredient of the reconstitutable product without detracting from the quality of the caramels. The most serious disadvantage which is noted in the commercial production of caramels using dried reconstitutable milk powder although the problem also results with some liquid milk products is that when the caramelization reaction takes place a "pudding-like" texture with poor flow properties results with the caramels as opposed to the flowable, pliable properties normally considered desirable in caramel-type products.

I have, therefore, determined that this undesirable "pudding-like" texture may be generally traced to the presence of a large amount of calcium ions which may normally be present in large amounts in the reconstitutable milk product although also present in milk products in general and that accordingly, the presence of these calcium ions aid in the coagulation of protein material which is present in the mixture during caramelization and induce the formation of an undesirable thick "pudding-like" or gel type of texture. Having recognized this problem, I have discovered that if a predetermined quantity of a sequestering agent is added to the milk or especially the reconstitutable product prior to the caramelization reaction the flow properties of the caramel produced is remarkably improved and the "pudding-like" texture accordingly prevented because of the sequestering of the calcium ions present in the milk or milk product and prevention of their reaction with the protein to cause the undesirable "pudding-like" texture.

The use of a sequestering agent to overcome this problem also eliminates the need for using a "low calcium" milk product, which while also solving the problem would not be commercially feasible because of the expense of controlling the calcium concentration thereof.

Although the undesirable "pudding-like" texture in caramels can exist because of the presence of calcium ions in liquid condensed milk products as well, the problem is much more pronounced when a dried, condensed milk product which is reconstitutable in water is employed because in the dried reconstitutable or imitation milk product made by combining casein and whey, more of the calcium is apparently present in the form of free calcium ions and capable of reacting with the protein than in the liquid milk product and accordingly will more often produce a severe "pudding-like" texture when used in the production of caramels.

SUMMARY OF THE INVENTION

I have, therefore, devised a novel process for the production of a caramel-type confectionary product which possesses consistently reproducible and desirable flow properties without the formation of a "pudding-like" or gel type of texture which comprises preparing a milk product by mixing concentrated fluid dairy whey and a proteinaceous source such as animal protein, additionally adding a partially hydrogenated fat to said mixture, drying the milk product to produce a readily reconstitutable condensed type milk product which is suitable for the production of caramels, and incorporating therewith a predetermined quantity of a sequestering agent in the dried condensed type milk product employed so as to sequester any calcium ions present in the milk product upon reconstitution and prevent coagulation or thickening of the protein material when it is used in the production of caramels during the caramelization reaction and produce a caramel-type product of improved and consistently reproducible flow properties with a soft, chewy texture.

It is, therefore, an object of the present invention to provide for a process of producing caramels of good flow properties from reconstitutable or dried milk products or from liquid milk products by the addition of a quantity of sequestering agent to prevent calcium induced coagulation of the protein and an undesirable "pudding-like" texture.

It is also an object of the present invention to provide an economic and commercially useful process for the production of caramel utilizing a wide range of commercially available ingredients without control of the calcium content to produce caramels or similar types of confectionary materials of desirable and consistently reproducible flow properties.

It is also an object of the present invention to provide a process for the production of caramel which has consistenly reproducible flow properties and which utilizes a dried reconstitutable condensed milk product by incorporating during the caramelization reaction used to produce the caramels a sequestering agent to render any free calcium ions which are present inactive and prevent their reacting with the protein to produce an undesirable "pudding-like" texture.

DESCRIPTION OF THE PREFERRED EMBODIMENTS

The dried reconstitutable milk product used in the present process for the production of caramels may be generally produced from a proteinaceous source either animal or vegetable protein or various mixtures thereof and fluid diary whey to produce a milk product containing from about 3% to 37% by weight protein and the percentage of protein being based on the weight of the resulting product. Depending upon the type of milk product desired and accordingly the texture or creaminess of caramels or confectionary products produced therewith, the various ingredients used in producing the milk product of the present invention may be varied to produce a product ranging from a skim milk or skim condensed milk product to a whole milk or a whole condensed milk product.

In a method of producing the present invention, an animal protein such as casein is added to fluid dairy whey in an amount sufficient to produce a resulting skim milk product which contains from about 3 to about 37% by weight protein with the percentage of protein being based on the weight of the resulting product. The liquid dairy whey may be initially concentrated by conventional means, i.e. an evaporator to a solid's content of from about 18% to about 37% by weight. To the concentrated liquid whey, casein is added to raise the protein content to the amount described above. The mixture is heated to an elevated temperature of from about 100° F. to about 140° F. preferably to about 140° F. to obtain a satisfactory and desirable viscosity. The pH of the heated mixture is adjusted to a range of from about 6.0 to 7.5 with compositions such as sodium hydroxide, magnesium hydroxide, ammonium hydroxide, and the like. Calcium hydroxide may also be employed to adjust the pH although the correspondingly higher calcium ion concentration produced in the product will later have to be compensated for by the use of a higher percentage of sequestering agent when the dried product is used in the production of caramels, since as previously noted, the presence of calcium ion promotes the formation of an undesirable "pudding-like" texture in caramels.

It is necessary to the present invention that this pH range be observed. If the pH is permitted to exceed 7.5, the milk product acquires an alkaline taste which imparts an unacceptable flavor or if the pH is permitted to fall below 6.0 the resulting product becomes unstable and solid particles will settle out of the liquid mixture during processing although in either case this may be dependent on the material used to adjust the pH.

Once the pH of the liquid mixture has been adjusted to the range of 6.0 to 7.5, it is again heated to a temperature from about 160° F. to about 170° F. preferably to about 160° F. with agitation to insure the liquid mixture does not solidify. The viscosity at this point may be quite high and the temperatures and agitation are essential if this is the case. The heated mixture may be then passed into a homogenizer as for example, a two-stage homogenizer wherein the first stage is at a pressure approaching 3000 p.s.i. and the second stage has a pressure of about 500 p.s.i. Following this, the concentrated mixture may be then dried by conventional means such as by the use of a spray drier, roller drier, and the like. The product produced by the method described thus far, is a skim milk type of product which while useful in the production of caramels is not preferred since the creaminess of the caramels is dependent upon the presence of fat and although a skim milk product may be employed to make caramels, a separate addition of fat to the mixture prior to caramelization is required to give the proper texture to the caramels.

A whole milk type product which is preferred for the production of caramels can be produced in accordance with the above described process by adding a vegetable or animal fat to the above described liquid mixture prior to drying. The fat should be present in the final product which is used in the production of caramels in an amount from about 1% to about 60% by weight based on the total solid's content of the resulting milk product although preferably for the production of caramels the fat content will more consistently be within the range of 25 to 60%.

The oil or fat ingredients that may be employed in the reconstitutable milk product which is employed in the present process for the manufacture of caramels are primarily vegetable or animal fats in solid or liquid form. The particular fats employed are not critical and may constitute one or more of the following, such as soy oil, corn oil, cottonseed oil, coconut oil, safflower oil and the like. Tests have shown that the physical properties of the final product can be varied under controlled conditions to provide fresh dairy products by controlled hydrogenation of at least part of the vegetable oils. According to conventional terminology, the term oil is employed when the material is liquid at normal room temperature, while the term fat is employed when the material is solid at room temperature. Since the basic composition remains the same, and since the desired melting point range of the final ingredient is near, at, or somewhat above the room temperature range, the terms oil and fat will be used herein generally interchangeably. The degree of hydrogenation will vary somewhat depending upon the oils used and the exact nature of the product desired. Specifically, by varying the fraction of the oil hydrogenated or the degree of hydrogenation of part or all of the oil, the degree of whiteness and the degree of creaminess of the final product may be varied between that of fresh whole milk and fresh cream. As a guide, the hydrogenation is regulated so that the melting point of the total combined vegetable fat ingredient to be added is preferably in the range of about 84° F. and 97° F., and should be in the range of about 77°–104° F. It has been found that this can be easily achieved to produce a simulated fresh whole milk, when a mixture of 50% nonhydrogenated oil and about 50% hydrogenated oil is used. With this ratio, the 50% hydrogenated portion is hydrogenated by conventional techniques to a higher melting point than the final melting point. The entire oil ingredient could alternatively be hydrogenated to a lesser extent, rather than hydrogenating a portion to a greater extent and then mixing it with another nonhydrogenated portion. By increasing the portion that is hydrogenated above 50%, or increasing the degree of hydrogenation, the final product will approach the character of fresh dairy cream. Using the above guidelines, those skilled in this field can vary this process step considerably to obtain the desired results.

In the production of caramels, the presence of fat not only imparts a creamy texture to the caramels but also provides lubrication for the machinery used during mixing and spreading as well as the consumer's teeth during chewing. Additionally, in the production of caramels the melting point of the fat should preferably not exceed 98° F. since if the melting point is too high the product will taste waxy, while on the other hand, if the melting point of the fat is too low, the product will have an oily taste. Hydrogenated fats or primarily solid or hard fats are additionally useful in that they give stand-up body to the caramels when the product is cold. While on the other hand, lower melting fats or soft fats do not contribute the same stand-up body to the caramels and also may be more prone to rancidity. Using the above guidelines with regard to the type of fat, those skilled in this field can vary this process step considerably to obtain the desired properties and flavor in the caramel or confectionary products.

The animal protein that may be employed in the present invention is preferably casein and casein related products such as casein and casein related materials which are currently available as for example, in the form of acid precipitated casein. In addition, from the standpoint of economy and convenience, various vegetable protein materials may be substituted for the animal protein derivatives in part, in order to produce a lower-cost simulated milk product although the percentage of vegetable protein material employed will be limited by the properties it imparts to the caramels or confectionary products.

The fluid dairy whey material that may be employed in the present invention is generally obtained as a by-product from dairy operations such as from the production of sweet type cheeses i.e., cheddar cheeses. This material is readily available at relatively low cost in comparison to other dairy products and is available either as a powdered type solid or as a liquid suspension solution of whey and water. As previously noted, insofar as producing an imitation condensed milk suitable for the production of caramels, it is necessary that the whey be generally concentrated to a solid's content of from about 18 to about 37% by weight. It is also preferred insofar as the present process for the production of caramels that the fluid dairy whey which is used in the production of the imitation condensed milk product be generally pasteurized at a temperature of about 160°–190° F. for 15 seconds to 1 hour either prior to mixing with the animal protein or casein or vegetable protein and pH adjustment, although the casein-whey mixture may also be pasteurized following pH adjustment but prior to drying. Pasteurization of the whey before mixing is necessary to destroy any bacteria present and prevent subsequent acidity in the milk product by the formation of lactic acid which will also contribute to the "pudding-like" texture insofar as the production of caramels since the acidity will promote the formation of free calcium ions.

Caramel is generally the product produced by the reaction between amino acids and various reducing sugars or carbohydrates at a temperature generally above 200° F. This reaction between the amino acids and reducing sugars is commonly referred to as the caramelization reaction. Caramels produced by this reaction are highly desirable as candy or a confectionary product although the exact type of caramel produced may be generally varied depending upon the ingredients employed and caramelization reaction conditions.

Caramels are most generally produced by a combination of milk, solids, sugar, water, and fat being heated at a temperature generally above 200° F. so that a caramelization reaction will occur and produce a product of a smooth, creamy chewable texture.

There are several types of sugar sources which are generally useful in the production of caramels. Crystalline sucrose is one of the most common sugars employed although other sugars are entirely suitable. On the other hand, various materials such as corn syrup or equivalent syrups may be employed to not only provide a sugar source but additionally increase the total solids in the caramels as well as influence the texture of the caramels by making a tougher, somewhat more chewable product.

The water which is part of the combination needed to produce caramels may be either contained in the corn syrup or the milk or may be added separately, the source of the water is not critical to the practice of the present invention since its prime purpose is to dissolve the sugars and serve as a media for the caramelization reaction.

As previously noted, the milk or milk product used in the manufacture of caramels is one of the most critical aspects of the production. The milk may be used in all available forms although liquid condensed sweetened milk is primarily preferred. Likewise the sweetened condensed milk may be either whole milk or skim milk and in either case each imparts body, color, and flavor to the caramels although skim milk is not as flavorful as whole milk because of the difference in the fat content. As previously noted, the fat serves an essential function of providing a creamy desirable texture to the caramels.

Dried reconstitutable milk products would also be highly desirable sources of milk, solids, and protein for the commercial production of caramels since a dried reconstitutable milk product is produced generally from a mixture of whey and casein and is accordingly high in milk, sugar, i.e. lactose, while the casein is able to serve as the main contributor of body and firmness in the caramels. Dried reconstitutable milk products have therefore a number of distinct advantages over the use of liquid condensed milk products in the production of caramels in that they may be mixed and incorporated in the process immediately prior to use without a requirement of expensive refrigerated storage as would be required for the liquid milk products. Likewise, liquid sweetened condensed milk must be generally maintained at a temperature of about 40° F. to prevent an unwanted reaction between the sugars and protein. It would, therefore, be highly desirable to devise a process for the production of caramels which could utilize a dried reconstitutable milk product which has present the requisite amount of fat, protein, and sugars to produce a caramel product of superior texture and flavor. As previously noted, however, the use of a dried reconstitutable condensed milk product as a replacement for required sweetened condensed milk has not generally been successful because of poorer flow properties of caramels produced when a dried reconstitutable milk product is employed. The poor flow properties may be generally termed as a coagulation of the protein or lumping thereof to produce a product which has a texture similar to pudding as opposed to the smooth creamy texture normally associated with caramels.

I have, therefore, determined that this undesirable "pudding-like" texture may be generally traced to the presence of free calcium ions which are more prevalent in the dried reconstitutable milk products as opposed to the liquid milk products because of the subsequent acid precipitation steps required to make a reconstitutable product and without the need for employing a milk source which is low in calcium which would add to the cost of caramels produced. I have found that if I incorporate in the dried reconstitutable milk product a sequestering agent that will render or sequester the free calcium ions that are present, this will prevent an inducement of the "pudding-like" texture by coagulation of the protein because of the presence of calcium ions. The particular material which may serve as the sequestering agent in the present invention may be any of a number of salts of various phosphoric acids such as triphosphoric acid, tetraphosphoric acid, metaphosphoric acid, pyrophosphoric acid, and orthophosphoric acid. The particular salt is not critical to the practice of the present invention and may be any salt of the above named acids considered suitable for food use although most generally they will be either the sodium or potassium salts. This sequestering agent when added to the dried reconstitutable milk product used in the present process for the production of caramels increases the flow properties of the caramel produced and reduces the probability of an undesirable "pudding-like" texture being formed. The amount of the sequestering agent which may be employed will preferably be between 0.2 and 1.5% by weight of the dried reconstitutable milk product and this amount will normally be added to sequester normally occurring amounts of calcium ions which may be present in the reconstitutable milk product as well as in the water used to reconstitute the dried milk product. The calcium concentration of the milk product or the water used should not be considered a limiting feature of the present invention since the amount of sequestering agent will normally be adequate to tie up any free calcium ions although of course, the calcium ion concentration may vary widely depending on the source of water as well as the milk product or the process used to produce it. Within this range of addition of sequestering agent the most consistent reproduction of the flow properties needed for caramels is obtained. Above this amount, unless the amount of calcium present is unusually high, the flow properties of the caramels are increased to the point where the desired body is no longer attained.

In the present invention, caramels of a smooth flowable texture may be attained by several alternate procedures. As previously noted, the sequestering agent may be incorporated or blended in the dried reconstitutable milk product which is then employed in a process for production of caramels. In a typical process, approximately equal portions of the water and the dried reconstitutable milk product incorporating the sequestering agent are mixed and stirred at an elevated temperature of preferably about 120° to 150° F. so as to remove and completely disperse the material. Following this, sugar is added in at least about twice the amount by weight of the dried milk product. The amount of sugar which will be employed will be readily apparent to one skilled in the art dependent upon the sweetness of the caramels, although the amount of sugar which will be employed will vary from about twice to as much as 7 times the weight of dried milk product employed since corn syrup is also normally added and it will also add to the sugar content of the mixture and this along with any crystalline sucrose or sugar added will contribute to the total sugar content of the caramels. Following the addition of the crystalline sugar, the corn syrup or corn syrup solids may be added in an amount of 0 to 60% by weight of the mixture depending on the sucrose content along with .25% to 1% by weight of salt. The entire mixture is agitated and well dispersed followed by cooking of the entire mixture to a temperature of 230° to 245° F. to carry out the caramelization reaction and produce the caramel product. After the caramel has been formed, it may be removed from the vat, formed into sheets or slabs, and allowed to cool followed by cutting or shaping into pieces or otherwise using as an ingredient in another confectionary product.

Another alternate procedure of the present invention insofar as using the sequestering agent is that the sequestering agent in the amounts indicated by weight of the mixture may be incorporated directly into the warm water used in the production of the caramels before any of the other ingredients are added and the addition of the agent at this point of the process will still function satisfactorily as adding to the dried milk product and produce caramels of a consistently reproducible texture with good flow properties.

Various other materials may be also added to the mixture prior to caramelization to produce certain desirable characteristics in the caramels, for example, various emulsifiers, such as lecithin, or albumen, or also glyceryl monostearate and soya flour may be added to insure adequate emulsion of the fats besides contributing to the body of the caramels produced.

Also various other flavorings, colors, or ingredients such as almonds, coconuts or walnuts may be added to impart a desirable flavor or texture to the product.

The following examples may generally be deemed to be illustrative of my invention.

EXAMPLE 1

Fluid sweet dairy whey having a solid's content of about 6% by weight is transferred to a vacuum evaporator and the fluid whey is reduced to a toal solid's content of about 20% by weight. The concentrated whey is then transferred to a 225 gallon processor in an amount of about 271 lbs. To the concentrated whey is added about 175 lbs. of acid precipitated case in and 165 lbs. of a partially hydrogenated vegetable oil with a melting point of 97° F. while the entire mixture is agitated. At this stage and while agitation is maintained, the temperature is adjusted to about 150–160° F. While continuing agitation, the mixture is then adjusted to a pH in the range of from about 6.0 to about 7.5. Following pH adjustment, the resulting mixture is then pasteurized at a temperature of about 80° F. for about 15 seconds.

The mixture is passed into a two-stage homogenizer wherein the pressure of the first stage is about 3000 p.s.i. and the pressure of the second stage is about 700 p.s.i. The mixture is homogenized until uniform and is then passed to a Coulter spray drier having an intake temperature of about 500° F., an exhaust temperature of about 165° F., and a nozzle of about 0.08 inch to produce a powdered product having particle size of about 250 microns.

The powdered product is then cooled and packaged and has a general composition as follows:

|  | Percent by weight |
|---|---|
| Fat | 27.5 |
| Sodium caseinate | 29.2 |
| Whey solids | 45.2 |

The dried product is readily dispersable in water and upon mixing therewith provides a whole condensed milk type product and suitable for the production of caramels.

EXAMPLE 2

11.75 pounds of the dried reconstitutable milk product as produced in Example 1 is weighed out. 0.85% by weight of the dried milk product of dipotassium phosphate was dissolved in about 5 lbs. of water in a 5 gallon steam kettle. The 11.75 lbs. of dried reconstitutable milk product was then added to the water and mixed. This mixture was added to a 30 gallon candy kettle and to which an additional 8.6 lbs. of water was added, 24 lbs. of sucrose, 1 lb. of starch, 48 lbs. of corn syrup, and .91 lb. of salt. The entire mixture was well mixed and cooked at a temperature of 237 to 255° F. A caramel-type confectionary product was produced having a soft, chewy texture with good stand-up properties although the caramel had the ability to easily flow after caramelization.

EXAMPLE 3

315 grams of the dried reconstitutable milk product as produced in Example 1 is weighed out. To the dried powder 0.5% by weight of disodium phosphate was added and thoroughly mixed therewith. The dried reconstitutable milk product with the disodium phosphate therein was dispersed in 407 grams of water and to this was added 660 grams of sugar, 113 grams of corn syrup solids and about 695 grams of corn syrup, and the entire mixture was thoroughly mixed followed by cooking at a temperature of around 238 to 240° F. with a caramel-type confectionary product being produced having a soft, chewy texture with good stand-up properties although the caramel had the ability to easily flow after caramelization.

EXAMPLE 4

315 grams of the dried reconstitutable milk product as produced in Example 1 is weighed out. 0.25% by weight of the dried milk product of dipotassium phosphate was added thereto and thoroughly mixed with the dried milk product. This mixture was then thoroughly dispersed in 390 grams of water. To this was added 660 grams of sucrose, 113 grams of corn syrup solids, 16.5 grams of starch and about 695 grams of corn syrup, and the entire mixture well mixed and cooked at a temperature of about 240° F. with a caramel-type confectionary product being produced having a soft, chewy texture with good stand-up properties and with the caramel having the ability to easily flow after caramelization.

EXAMPLE 5

526 grams of the dried reconstitutable milk product as produced in Example 1 is dispersed in 612 grams of water, the water having previously had dissolved therein 0.42% dipotassium phosphate by weight of the milk product. The water was warmed to a temperaure of about 125° F. and transferred to a candy kettle to which was added 1103 grams of sucrose and 25 grams of starch, 4.16 lbs. of corn syrup, and the mixture was thoroughly mixed and cooked at a temperature of about 240° F. The material produced was a caramel-type product and could be poured freely from the kettle. After cooling, the product had a smooth, soft, chewy texture.

EXAMPLE 6

526 grams of the dried reconstitutable milk product as produced in Example 1 is dispersed in 612 grams of water, the water having previously had dissolved therein 0.2% by weight of sodium hexametaphosphate. The water was warmed to a temperature of about 125° F. and transferred to a candy kettle to which was added 1103 grams of sucrose and 25 grams of starch, 4.16 lbs. of corn syrup, and the mixture was thoroughly mixed and cooked at a temperature of about 240° F. The material produced was a caramel-type product and could be poured freely from the kettle. After cooling, the product had a smooth, soft, chewy texture.

EXAMPLE 7

Three portions of 526.6 grams each of the dried reconstitutable milk product as produced in Example 1 is weighed out and labeled Samples 1, 2, and 3. Each sample of the dried milk product is reconsttiuted in 613 grams of water and to Sample 1, 0.8% by weight of the milk product of sodium hexametaphosphate is added, to Sample 2 is added 0.4% by weight of the milk product of sodium hexametaphosphate and to Sample 3 is added 0.2% by weight of the milk product of sodium hexametaphosphate. Each sample is thoroughly dispersed by slight warming of the water to a temperature of 140° F. To each of the warm mixtures was added 1103 grams of sucrose and 25 grams of starch in addition to 40 grams of salt, and 4.16 lbs. of corn syrup. Each sample was then transferred to a candy kettle and cooked at a temperature of 238 to 240° F. with a carmel-type confectionary product being produced in each case and with the following observations with regard to each sampe:

Sample 1: After caramelization this mixture flowed easily when removed from the kettle and was of a good color with a smooth texture.

Sample 2: After caramelization this mixture flowed easily when removed from the kettle and was of a good color with a smooth texture.

Sample 3: This sample was of a smooth texture and a good color although it did not pour as readily from the kettle as either of the above two samples and was somewhat more viscous than Samples 1 or 2 although flow properties were satisfactory.

EXAMPLE 8

Three portions of 526.6 grams each of the dried reconstitutable milk product produced in Example 1 is weighed out and labeled Samples 1, 2, and 3. To Sample 3 was added about 1.5% by weight of sodium hexametaphosphate. Each sample was then dissolved in about 613 grams of water which had been previously heated to about 140° F. followed by the addition to each sample of 1103 grams of sucrose, 25 grams of starch, 40 grams of salt, and 4.16 lbs. of corn syrup. Each sample was thoroughly mixed followed by transfer to a candy kettle with cooking at a temperature of 238 to 240° F. with a caramel-type product being produced in each case and with the following observations on each sample:

Sample 1: This sample had good consistency at the beginning of the cooking although the product became increasingly more viscous and at the end of the cooking had an undesirable "pudding-like" texture and was unsuitable as a caramel-type product.

Sample 2: This sample likewise had good consistency at the beginning of the cooking although it likewise attained a "pudding-like" texture upon continued cooking and would be considered unacceptable as a carmel product.

Sample 3: This sample also had good consistency at the start but after caramelization had good color, was of a smooth texture, and readily poured from the reaction kettle. The product likewise had fair to good stand-up quality.

It is believed that one having ordinary skill in the art could alter the details of the process taught by the above description in order to obtain the desired product. These variations are considered within the inventive concept herein and is limited only by the scope of the appended claims and the reasonable equivalency thereof.

I claim:

1. A process for the production of caramels of improved flow properties comprising dispersing a dried reconstitutable milk product containing dairy whey and a proteinaceous source selected from the group of animal and vegetable protein and mixtures thereof to obtain from about 3 to 37% protein by weight and having a fat content selected from the group of vegetable and animal fat of from about 25 to 60% by weight in an aqueous medium, said milk product having been dried at a pH of 6.0 to 7.5, mixing therewith a sequestering agent in a sufficient amount to tie-up the free calcium ions in the mixture, adding sugar in at least about twice the amount by weight of said dried milk product with minor amounts of solids, flavoring, and salt, heating the entire mixture to an elevated temperature adequate to caramelize said mixture and produce caramel of a soft, chewy, texture, having improved flow properties.

2. A process as set forth in claim 1 wherein said sequestering agent is added in an amount of between about 0.2 and 1.5% by weight of the dried reconstitutable milk product.

3. A process as set forth in claim 1 wherein said heating step is carried out at a temperature of between about 230 to 245° F.

4. A process as set forth in claim 1 wherein said sequestering agent is selected from the group consisting of salts of triphosphoric acid, tetraphosphoric acid, metaphosphoric acid, pyrophosphoric acid, and orthophosphoric acid.

5. A process as set forth in claim 1 wherein the fat in said dried reconstitutable milk product has a melting point not exceeding that of 98° F.

6. A process as set forth in claim 1 wherein said aqueous medium a dried reconstitutable milk product, said to aid in the dispersion of said milk product therein.

7. A process for the production of caramels of improved flow properties comprising dispersing in an aqueous medium a dried reconstitutable milk product, said milk product having been dried at a pH of 6.0 to 7.5 and containing dairy whey and a proteinaceous source selected from the group of animal and vegetable protein and mixtures thereof to obtain from about 3 to 37% protein by weight with a fat content selected from the group of vegetable and animal fat of from about 25 to 60% by weight and a sequestering agent, the sequestering agent being present in a sufficient amount to tie-up the free calcium ions in the mixture when dispersed in the aqueous medium, adding sugar in at least about twice the amount by weight of said dried milk product with minor amounts of flavoring and salt; and heating the entire mixture to a temperature adequate to caramelize said mixture and produce caramel of a soft chewy texture having improved flow properties.

8. A process as set forth in claim 7 wherein said sequestering agent is intermixed with said dried milk product in an amount of between about 0.2 to 1.5% by weight of said product.

9. A process as set forth in claim 7 wherein said heating step is carried out at a temperature of between about 230 to 245° F.

10. A process as set forth in claim 7 wherein said sequestering agent is selected from the group consisting of salts of triphosphoric acid, tetraphosphoric acid, metaphosphoric acid, pyrophosphoric acid, and orthophosphoric acid.

11. A process as set forth in claim 7 wherein the fat in said dried reconstitutable milk product has a melting point not exceeding that of 98° F.

12. A process as set forth in claim 7 wherein said aqueous medium is heated to a temperature above 120° F. to aid in the dispersion of said milk product therein.

13. A process for the production of caramels of improved flow properties comprising dispersing a dried reconstitutable milk product containing dairy whey and a proteinaceous source selected from the group of animal and vegetable protein and mixtures thereof to obtain from about 3 to 37% protein by weight in an aqueous medium, said milk product having been dried at a pH of 6.0 to 7.5 and mixing therewith a sequestering agent selected from the group consisting of salts of triphosphoric acid, tetraphosphoric acid, metaphosphoric acid, pyrophosphoric acid, and orthophosphoric acid in an amount of between about 0.2 and 1.5% by weight of the dried reconstitutable milk product, adding to said mixture a fat in an amount of 25 to 60% by weight of said milk product and having a melting point not exceeding that of 98° F., adding sugar in at least about twice the amount by weight of the dried milk product with minor amounts of solids, flavoring, and salt, and heating the entire mixture to a temperature of 230 to 245° F. to caramelize said mixture and produce caramels of a soft chewy texture with improved flow properties.

14. A process for the production of caramels of improved flow properties which comprises the steps of: concentrating fluid dairy whey to a total solid's content of from about 18% to about 37% by weight of said whey, forming a mixture by adding to said concentrated whey a proteinaceous source in an amount sufficient to produce a resulting milk product containing from about 3 to 37% by weight protein based on the total weight of said resulting product; heating the mixture to a first elevated temperature to obtain a desirable viscosity of the mixture while adding a fat, adjusting the pH of the mixture to a range of from about 6.0 to 7.5, heating to a second elevated temperature while simultaneously agitating said mixture to insure the liquid mixture does not solidify, spray drying said mixture to produce a dried reconstitutable milk product containing from about 3 to 37% protein by weight and having a fat content of from about 1 to 60% by weight, dispersing said milk product in an aqueous medium, mixing therewith a sequestering agent in a sufficient amount to tie-up the free calcium ions in the mixture, adding sugar in at least about twice the amount by weight of said dried milk product with minor amounts of flavoring, solids, and salt, and heating the entire mixture to a temperature adequate to caramelize said mixture and produce caramel of a shoft chewy texture having improved flow properties.

15. A process as set forth in claim 14 wherein said sequestering agent is added in an amount of between about about 0.2 and 1.5% by weight of the dried reconstitutable milk product.

16. The method according to claim 15 wherein the first elevated temperature is in the range of from about 100 to about 140° F.

17. The method according to claim 15 wherein the second elevated temperature is in the range of from about 160° to about 170° F.

18. The method according to claim 15 wherein said fat is selected from the group consisting of animal and vegetable fat and is added in an amount from about 25 to about 60% by weight based on the total solid's content of the mixture.

19. A process as set forth in claim 15 wherein the fat in said dried reconstitutable milk product has a content of from about 25 to 60% by weight of a fat having a melting point not exceeding that of 98° F.

20. The method according to claim 15 wherein said proteinaceous source is selected from the group consisting of animal protein, vegetable protein, and mixtures thereof.

21. A process as set forth in claim 15 wherein said heating of the entire mixture to a temperature adequate to caramelize said mixture is carried out at a temperature of between about 230 to 245° F.

22. A process as set forth in claim 15 wherein said sequestering agent is selected from the group consisting of salts of triphosphoric acid, tetraphosphoric acid, metaphosphoric acid, pyrophosphoric acid, and orthophosphoric acid.

23. A process for the production of caramels of improved flow properties which comprises the steps of concentrating fluid dairy whey to a total solid's content of from about 18% to about 37% by weight of said whey; forming a mixture by adding to said concentrated whey a proteinaceous source in an amount sufficient to produce a resulting milk product containing from about 3 to 37% by weight protein based on the total of said resulting product, heating the mixture to a first elevated temperature to obtain a desirable viscosity of the mixture while adding a fat, adjusting the pH of the mixture to a range of from about 6.0 to 7.5, heating to a second elevated temperature while simultaneously agitating said mixture to insure the liquid mixture does not solidify, spray drying said mixture to produce a dried reconstitutable milk product containing from about 3 to 37% protein by weight and having a fat content of from about 1 to 60% by weight, intermixing with said dried product a sequestering agent in a sufficient amount to tie-up the free calcium ions in the mixture when subsequently dispersed in an aqueous medium, dispersing said milk product in an aqueous medium, adding sugar in at least about twice the amount by weight of said dried milk product with minor amounts of flavoring, solids, and salt and heating the entire mixture to a temperature adequate to caramelize said mixture and produce caramel of a soft, chewy texture having improved flow properties.

24. A process as set forth in claim 23 wherein said sequestering agent is added in an amount of between about 0.2 and 1.5% by weight of the dried reconstitutable milk product.

25. The method according to claim 24 wherein the first elevated temperature is in the range of from about 100 to about 140° F.

26. The method according to claim 24 wherein the second elevated temperature is in the range of from about 160° to about 170° F.

27. The method according to claim 24 wherein said fat is selected from the group consisting of animal and vegetable fat and is added in an amount from about 25 to about 60% by weight based on the total solid's content of the mixture.

28. A process as set forth in claim 24 wherein said dried reconstitutable milk product has a content of from about 25 to 60% by weight of a fat having a melting point not exceeding that of 98° F.

29. The method according to claim 24 wherein said proteinaceous source is selected from the group consisting of animal protein, vegetable protein, and mixtures thereof.

30. A process as set forth in claim 24 wherein said heating of the entire mixture to a temperature adequate to caramelize said mixture is carried out at a temperature of between about 230 to 245° F.

References Cited

UNITED STATES PATENTS 2,407,027   9/1946   Mason et al. _____ 99—63

OTHER REFERENCES

Skuse's Complete Confectioner 13th ed. Bush & Co. Ltd., London, England, 1957, pp. 104–105 TX 783 S5.

A. LOUIS MONACELL, Primary Examiner

J. M. HUNTER, Assistant Examiner